United States Patent
Schatz

(10) Patent No.: US 6,446,758 B1
(45) Date of Patent: Sep. 10, 2002

(54) FRONT END FORKLIFT TRUCK WITH PIVOTABLE OPERATOR SEAT UNIT

(76) Inventor: Werner Schatz, Schaichstrasse 33, 72631 Aichtal (DE)

( * ) Notice: Subject to any disclaimer, the term of this patent is extended or adjusted under 35 U.S.C. 154(b) by 0 days.

(21) Appl. No.: 09/459,244

(22) Filed: Dec. 10, 1999

Related U.S. Application Data

(63) Continuation-in-part of application No. PCT/EP98/03418, filed on Jun. 8, 1998.

(30) Foreign Application Priority Data

Jun. 12, 1997 (DE) ........................... 197 24 702.4
Jul. 3, 1997 (DE) ........................... 197 28 312.8

(51) Int. Cl.⁷ .................................................. B66F 9/06
(52) U.S. Cl. .................. 187/222; 297/344.26; 297/335
(58) Field of Search .................. 187/222, 227, 187/414; 180/326, 329, 330; 297/344.26, 344.21, 335, 336

(56) References Cited

U.S. PATENT DOCUMENTS

| | | | | |
|---|---|---|---|---|
| 3,039,553 A | * | 6/1962 | Van Der Lely et al. | 180/329 |
| 3,088,537 A | * | 5/1963 | Le Tourneau | 180/329 X |
| 3,132,486 A | * | 5/1964 | Jonkers et al. | 180/329 X |
| 3,223,193 A | * | 12/1965 | Reynolds et al. | 180/329 |
| 3,357,513 A | * | 12/1967 | Sunberg | 180/329 |
| 3,827,747 A | * | 8/1974 | Cookes | 296/65.07 |
| 3,897,960 A | * | 8/1975 | Cosby | 280/755 |
| 4,097,085 A | * | 6/1978 | Nelson | 180/329 |
| 4,730,691 A | * | 3/1988 | Grigg | 180/326 |
| 5,038,887 A | * | 8/1991 | Sousek | 18/329 |

FOREIGN PATENT DOCUMENTS

| | | | | |
|---|---|---|---|---|
| DE | 1162213 A | * | 1/1964 | 180/329 |
| DE | 2113770 | * | 10/1972 | |
| DE | 2834447 A1 | * | 2/1980 | |
| GB | 1376868 | * | 12/1974 | 187/222 |
| GB | 1432940 | * | 4/1976 | |

* cited by examiner

Primary Examiner—Dean J. Kramer
Assistant Examiner—Thuy V. Tran
(74) Attorney, Agent, or Firm—Klaus T. Bach

(57) ABSTRACT

In a front end forklift truck having an undercarriage with a load lifting unit disposed at its front end and a rear box structure with drive components disposed at its rear end, an operator seat unit is mounted on a pivot column disposed in front of the rear box structure and includes an operator seat projecting rearwardly from the column over the box structure. A footrest and pedal structure extend forwardly from the bottom area of the column for pivotal movement therewith. Steering and control members for steering the forklift truck and for controlling the load lifting unit are mounted to the pivotable operator seat.

6 Claims, 3 Drawing Sheets

FRONT END FORKLIFT TRUCK WITH PIVOTABLE OPERATOR SEAT UNIT

This is continuation-in-part application of international patent application PCT/EP98/03418 filed Jun. 08, 1998 and claiming the priority of German applications 197 24 702.4 filed Jun. 12, 1997 and 197 28 312.8 filed Jul. 3, 1997.

BACKGROUND OF THE INVENTION

The invention relates to a front end forklift truck with a pivotable operator seat unit mounted on the truck body between a front end lift structure and a rear box structure, which receives drive components and serves as a counterweight.

The invention is particularly concerned with forklift trucks for use in storage buildings. Such forklift trucks must be short and maneuverable in narrow spaces. In such front end forklifts, the space between the front end lift structure and the rear box structure, which extends over the full width of the fork lift and accommodates the batteries and/or other drive components and which, at the same time, serves a counterweight, is quite tight. Therefore, the operator seat is generally mounted rigidly onto the cover of the rear box structure.

Since the load picked up by the lift structure often blocks the front view of the operator, most loads are transported in reverse while the operator twists his body on the rigid seat backward. This, however, tires the operator's back and his neck and may even result in health problems. It would therefore be desirable to support the seat so that it can be pivoted.

The magazine "MECHANICAL HANDLING", Mar. 1969, Page 73, describes a large front end fork lift truck in which the complete operator seat unit consisting of an operator seat and a steering and operating control panel is supported between the front end lift structure and the rear box structure on a plate which is not only rotatable about a vertical axis, but which also can be moved sidewardly over the width of the forklift truck. Such a design, however, cannot be transferred to compact front end forklift trucks since there is simply not sufficient space available.

DE OS 30 42 956 discloses a front end forklift truck with an operator seat unit which includes a steering and operating control panel and which is rotatable by 180°. In this arrangement front and rear sets of pedals are provided so as to be used depending on whether the operator faces toward the front or toward the back. The operator space extends almost over the full length of the vehicle and over half of its width. The battery box structure takes up the other half of the width of the vehicle. However, at least as shown in the publication, the arrangement does not appear to be operative since the pivot axis is shown in the center of the vehicle so that any pivot movement appears to be blocked by the battery box structure. The arrangement is therefore not practicable as shown and certainly cannot be used in connection with compact forklift trucks which have a rear box structure extending over the full width of the vehicle.

There is further a forklift truck in use (Company Linde, Type 25 "Panorama"), wherein the operator seat is disposed on a turn structure disposed below the operator seat so that it is pivotable about a vertical axis by 45°. An operator control panel for controlling the lift unit is mounted to the operator seat and is movable with the seat. A steering wheel is sta tionary and two sets of pedals are provided, one for each pivot end position of the operator seat. In this design, the operator seat is arranged relatively high on an intermediate deck in order to permit installation of the pivot arrangement for the seat.

As a result, it is not only relatively difficult for the operator to climb into the seat, but the center of gravity of the forklift truck is relatively high so that it has a relatively low tipping stability. In addition, the operator may get confused with all the pedals or his feet may get stuck in the pedals. Furthermore, the steering wheel position is inconvenient in any position of the operator.

It is the object of the present invention to provide for a compact forklift truck a pivotable operator seat unit which does not require the seat to be noticeably raised.

SUMMARY OF THE INVENTION

In a front end forklift truck having a load lifting unit disposed at its front end and a rear box structure with drive components disposed at its rear end, an operator seat unit is mounted on a pivot column disposed in front of the rear box structure so as to project rearwardly from the column over the box structure. A footrest and pedal structure extend forwardly from the bottom area of the column for pivotal movement there with. Steering and control members for steering the forklift truck and for controlling the load lifting unit are mounted to the pivotable operator seat.

The arrangement can easily be accommodated by compact forklift trucks of conventional design. Since the operator seat extends from the support column over the rear box structure the seat is barely higher than it would be if mounted directly onto the box structure.

An embodiment of the invention will be described in detail on the basis of the accompanying drawings.

DESCRIPTION OF A PREFERRED EMBODIMENT

Figure 1:
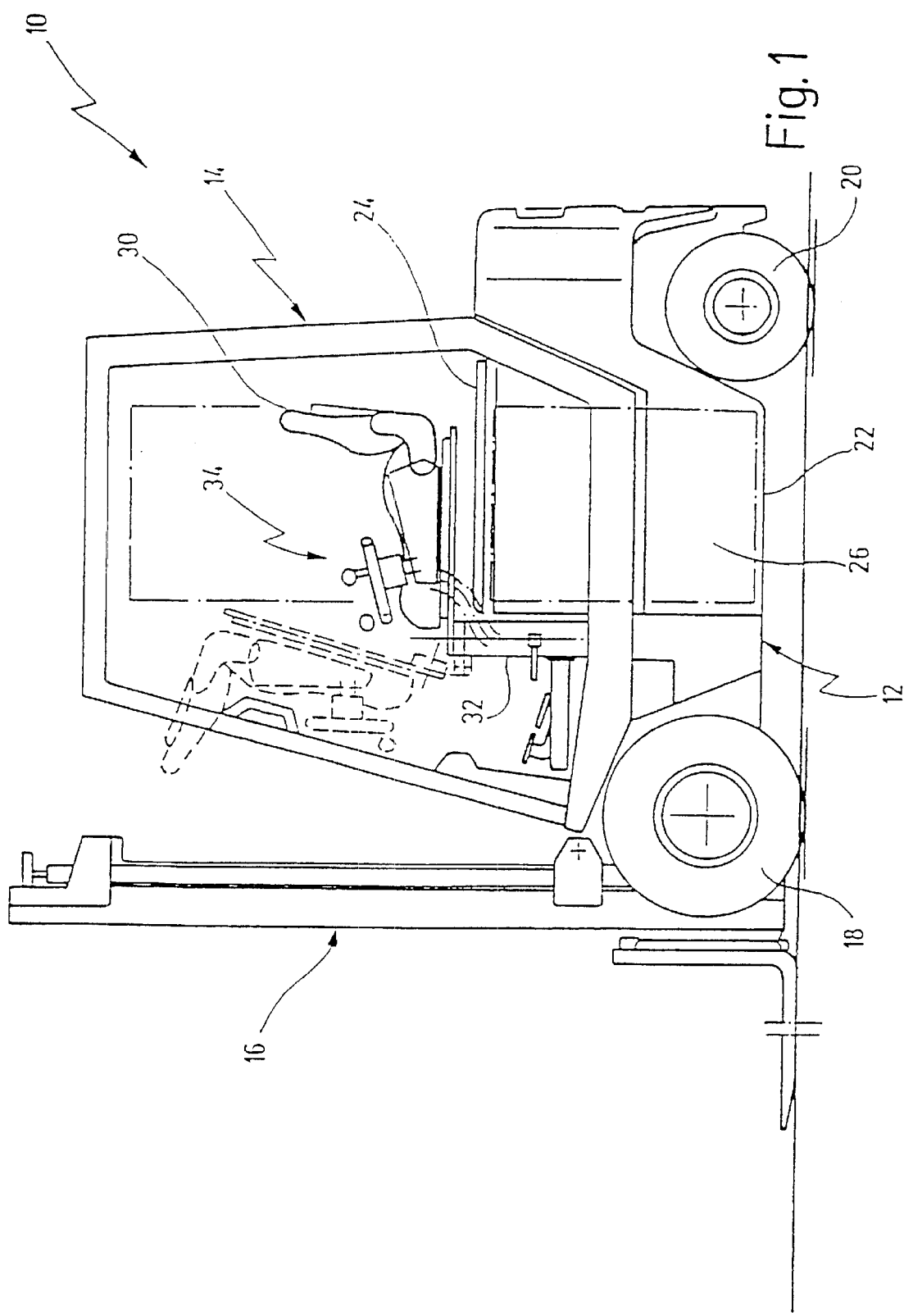
FIG. 1 is a side view of a front end forklift truck according to the invention.

The forklift truck 10 as shown in the drawings comprises an undercarriage 12 with an operator cabin 14 including an operator seat unit 34 pivotally supported therein. A load lifting unit 16 including a lifting frame and a lifting fork is mounted to the front end of the undercarriage 12. Two front wheels 18 and two steerable rear wheels 20 and further a rear box structure 22 with a lid 24 are also mounted to the under carriage 12. The forklift truck 10 is operated by an electric motor, which is not shown. It is energized by a battery 26, which is disposed in the box structure 22 and which also serves as a counterweight for loads lifted by the load lifting unit 16.

Figure 2:
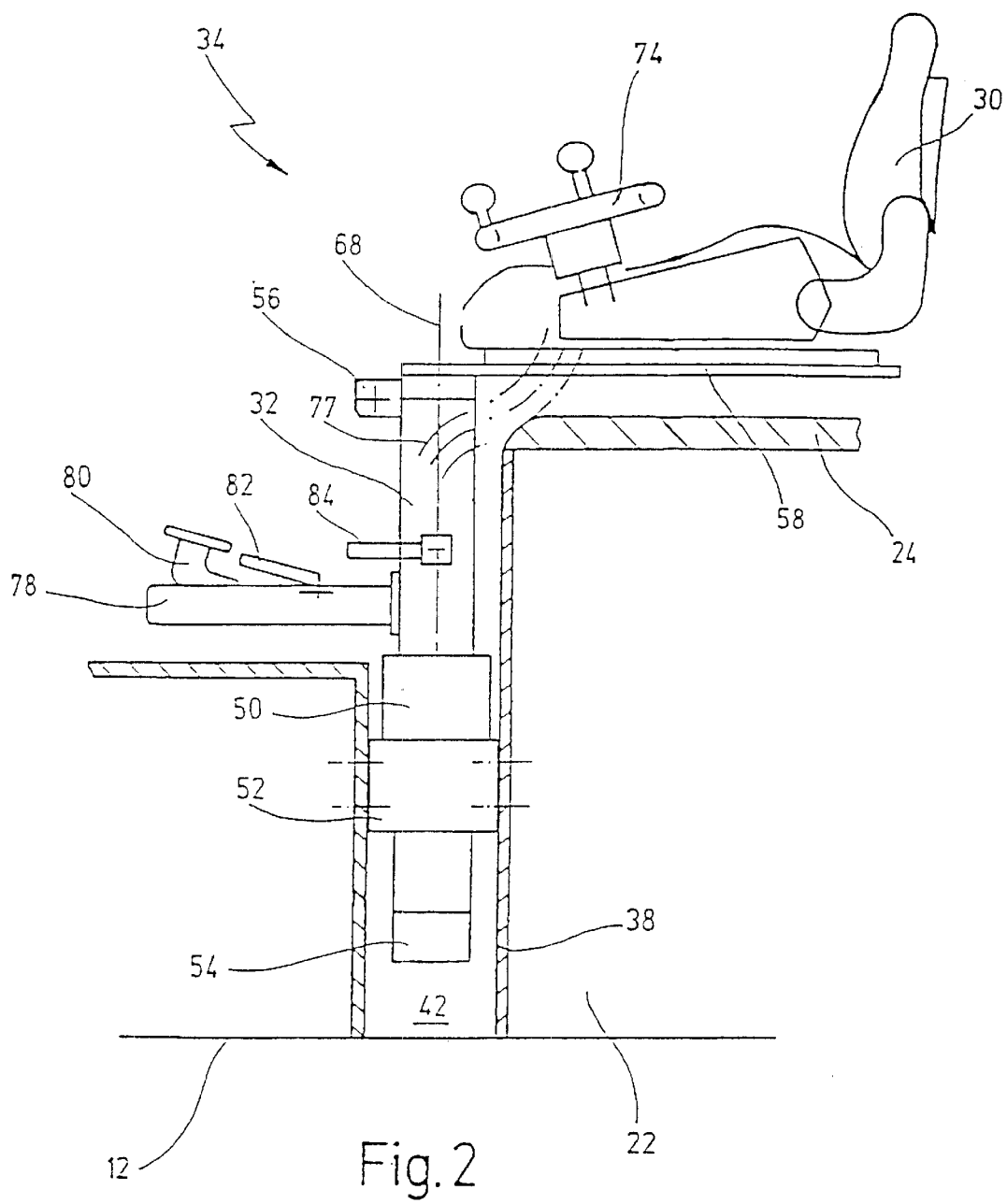
FIG. 2 shows a pivotable operator seat unit of the fork lift truck as shown in FIG. 1, and FIGS. 3a, 3b, and 3c are top views of the forklift truck showing the pivotable operator seat unit in various pivot positions.

The pivotable operator seat unit 34 arranged in the operator cabin 14 is shown in detail in FIG. 2. It includes a vertical column 32, which is disposed in front of a front wall 38 of the rear box structure 22. It is rotatably supported by a bearing structure 52 including a ball bearing 50 disposed in a recess 42 provided in the undercarriage 12 so as to be rotatable about an axis 68. At its upper end, the column 32 carries a seat console 58 with an operator seat 30, which project backwardly over the lid 24 of the rear box structure 22. The seat console 58 can be pivoted upwardly about a hinge 56 with a horizontal axis, as shown in FIG. 1 by dashed lines, in order to make it possible to open the lid 24 for servicing the battery 26.

The seat console 58 includes, in the area of a left armrest a steering wheel 74 for steering the wheels and in the area of the right armrest, a joystick 76 for controlling the load lifting unit 16. The steering wheel 74 and the joystick 76 are in the form of signal generators for electrical or hydraulic control signals.

In a lower area, the column 32 includes a foot console 78 with a drive pedal 82 and a brake pedal 80. The column 32 is hollow and serves as a guide tube for receiving the electrical and, respectively, hydraulic lines extending between the steer ing wheel 74, the joystick 76, the pedals 80 and 82 and the respective steering and control members. A penetration 54 at the lower end of the column 32 provides for connection between the hydraulic and electrical lines in the column 32 with stationary lines. The electric and hydraulic lines, particularly the hydraulic brake line from the brake pedal 80, could also be directly connected to the respective stationary line by providing a flexible line section with a loop accommodating rotation of the operator seat unit 34. In FIG. 2, the lines extending from the steering wheel 74 and the joystick 76 into the hollow column 32 are shown schematically by dash-dotted lines 77.

Figure 3A:
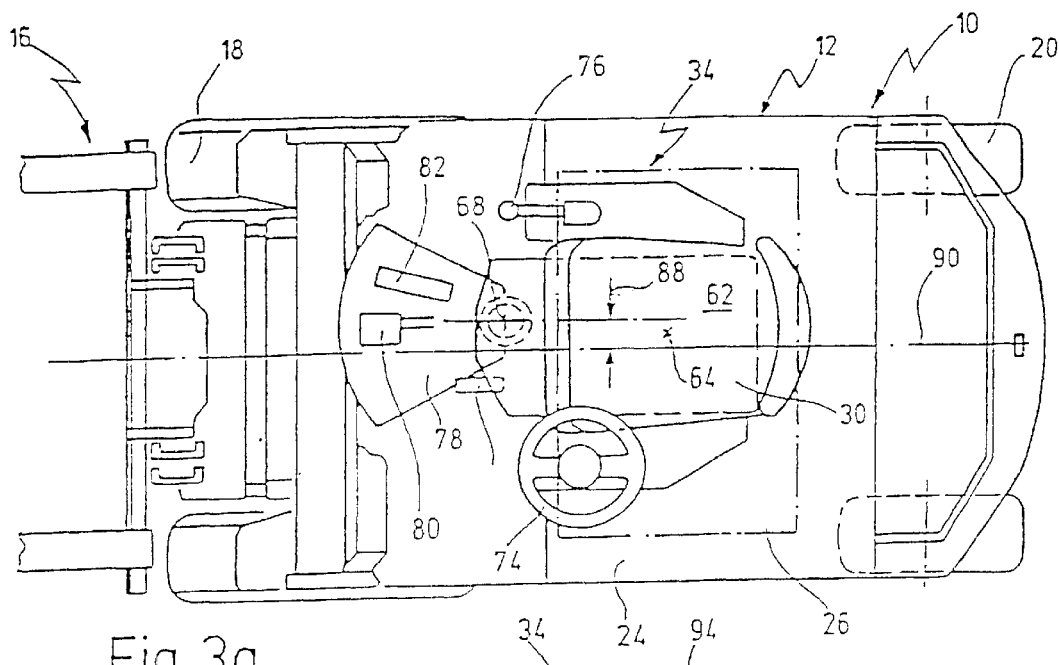

From the top view of FIG. 3a, it is apparent that the pivotable operator seat unit 34 is slightly displaced from the longitudinal center line 90 of the forklift truck 10 to the right side. The operator seat unit 34 is shown in FIG. 3a in its normal pivot position, that is, in parallel alignment with the longitudinal centerline 90 of the forklift truck 10. With the sideward displacement of the operator seat unit 34, and particularly the pivot axis 68 of the support column 32, from the longitudinal center line 90 of the forklift truck 10, the operator seat unit 34 can be pivoted in a counter-clockwise direction (FIG. 3b) by an only relatively small angle 92. However in clockwise direction, it can be pivoted by a relatively large angle 93 without any part of the seat unit projecting beyond the outer contour of the forklift truck 10. In order to maximize such pivot angles, the armrests are provided with chamfers 94 at their rear end portions.

Figure 3B:
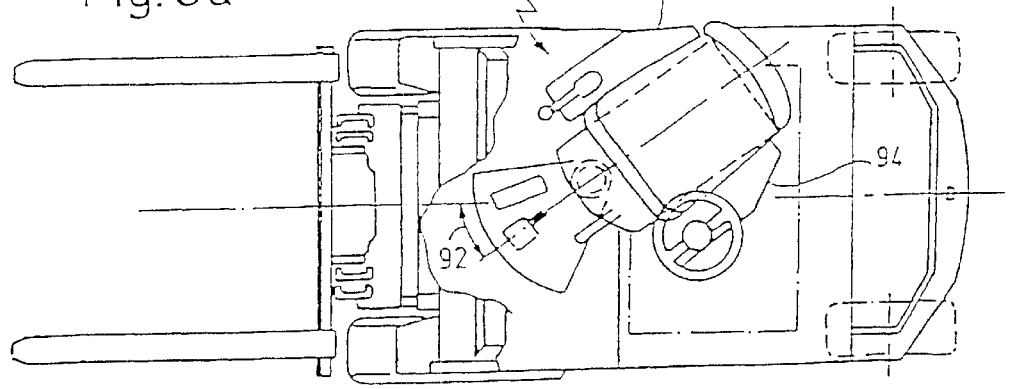
Figure 3C:
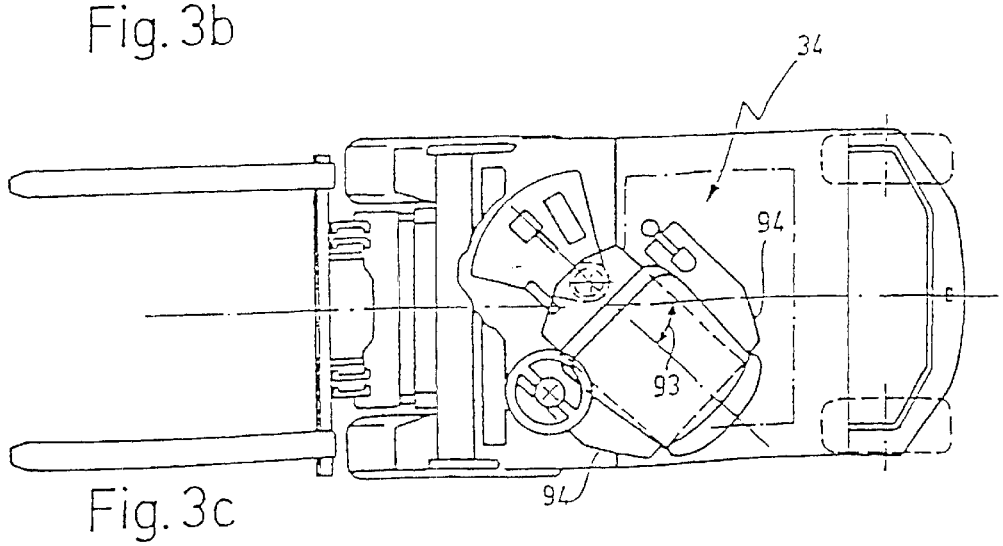

The pivotable operator seat unit can be locked in each of the pivot positions shown in FIGS. 3a, 3b and 3c. A locking lever 84 (shown in FIG. 2) at the column 32 serves to unlock the respective position locking mechanism.

What is claimed is:

1. A front end forklift truck comprising: an undercarriage having a front and a rear end, a load lifting unit mounted to the front end of said undercarriage, a rear box structure having a front wall and receiving drive components disposed on the rear end of said undercarriage so as to serve as counterweight for said load lifting unit, and an operator seat unit including a vertical column disposed in front of said front wall of said rear box structure and being pivotally supported at a bottom end thereof by a pivot bearing disposed in said undercarriage, an operator seat mounted on the top end of said column so as to project rearwardly over said box structure, a footrest/pedal unit mounted to the lower end of said column so as to project therefrom forwardly, and steering and control members for steering the fork lift truck and for operating said load lifting unit mounted to said pivotable operator seat unit.

2. A front end forklift truck according to claim 1, wherein said vertical column is hollow and electrical and hydraulic lines connected to said pedals and steering and control members and leading to other components of said forklift truck extend through said hollow column.

3. A front end forklift truck according to claim 1, wherein said steering and control members are arranged at opposite sides of said operator seat.

4. A front end forklift truck according to claim 1, wherein said operator seat is mounted to said column by way of a hinge disposed at a front edge of said operator seat such that it can be pivoted forwardly to permit access to said box structure.

5. A front end forklift truck according to claim 1, wherein said seat unit is provided with a locking structure including a locking lever for releasably locking said operator seat unit in various pivot positions thereof.

6. A front end forklift truck according to claim 1, wherein said column is displaced sidewardly from a longitudinal center line of said forklift truck and of the center line of said operator seat such that the pivot angle for the operator seat unit out of the center position of the operator seat is greater in one pivot direction than in the other.

\* \* \* \* \*